US011108719B2

(12) United States Patent
Bhagwan et al.

(10) Patent No.: US 11,108,719 B2
(45) Date of Patent: Aug. 31, 2021

(54) SYSTEM AND METHOD FOR SELF-DESTRUCTING MESSAGES

(71) Applicant: VERIZON MEDIA INC., New York, NY (US)

(72) Inventors: Varun Bhagwan, San Jose, CA (US); Gowri Kanugovi, Fremont, CA (US); Jeffrey Bonforte, Los Altos, CA (US); Doug Sharp, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 223 days.

(21) Appl. No.: 14/563,922

(22) Filed: Dec. 8, 2014

(65) Prior Publication Data

US 2016/0164816 A1    Jun. 9, 2016

(51) Int. Cl.
*H04L 12/58*    (2006.01)

(52) U.S. Cl.
CPC .............. *H04L 51/18* (2013.01); *H04L 51/22* (2013.01); *H04L 51/34* (2013.01)

(58) Field of Classification Search
CPC .......... H04L 51/18; H04L 51/22; H04L 51/34
USPC ........................................................ 709/206
See application file for complete search history.

(56) References Cited

U.S. PATENT DOCUMENTS

| 8,626,844 | B2 * | 1/2014 | Schulzrinne | G06F 16/951 709/206 |
| 8,719,238 | B2 * | 5/2014 | Horn | G06Q 10/107 707/694 |
| 8,930,474 | B2 * | 1/2015 | Sobhani | H04L 51/22 709/205 |
| 2011/0213845 | A1 * | 9/2011 | Logan | G06Q 10/107 709/206 |
| 2014/0379495 | A1 * | 12/2014 | Fielder | G06Q 30/0277 705/14.73 |
| 2015/0281156 | A1 * | 10/2015 | Beausoleil | H04L 51/12 709/206 |

FOREIGN PATENT DOCUMENTS

CA            2362592  A1 *  8/2011  ........... G06Q 10/107

* cited by examiner

*Primary Examiner* — Esther B. Henderson
*Assistant Examiner* — Nazia Naoreen
(74) *Attorney, Agent, or Firm* — James J. DeCarlo; Greenberg Traurig, LLP

(57) ABSTRACT

Disclosed are systems and methods for automatically deleting messages from a recipient's inbox. The disclosed systems and methods provide the ability for automatic actions to be taken on delivered messages based on a passage of time. This enables a sender of messages, email service provider and/or email platform to exert control over sent messages to limit the number and type of operations that may be performed on such messages. For example, operations such as saving, forwarding, printing, copying, or otherwise duplicating the message and/or message data can be prohibited and all together rendered impossible. The disclosed systems and methods enables the purging of messages and associated message data from a recipient's inbox at a certain specified time, after the passage of a pre-determined amount of time, or upon the detection of a specified event.

20 Claims, 6 Drawing Sheets

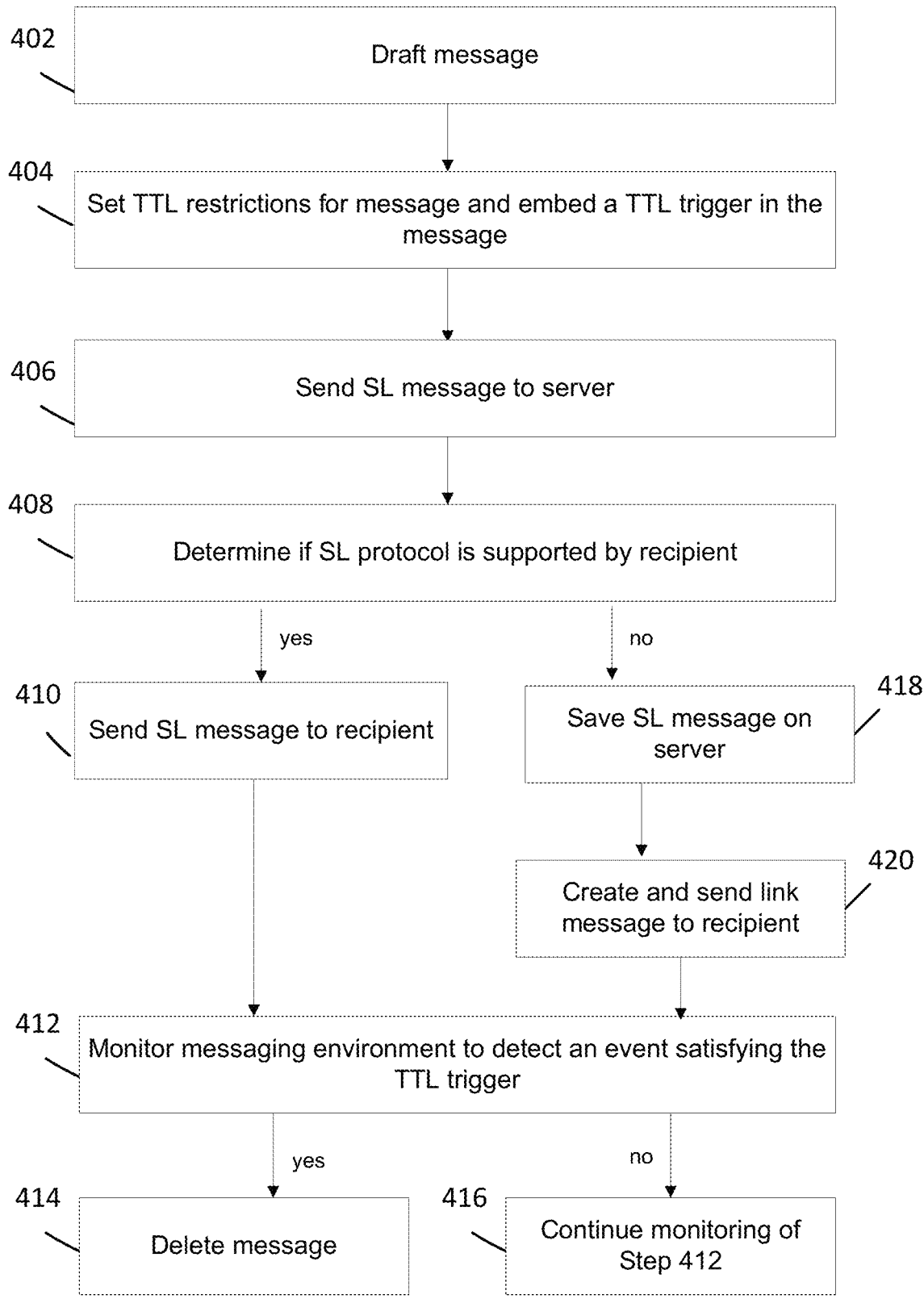

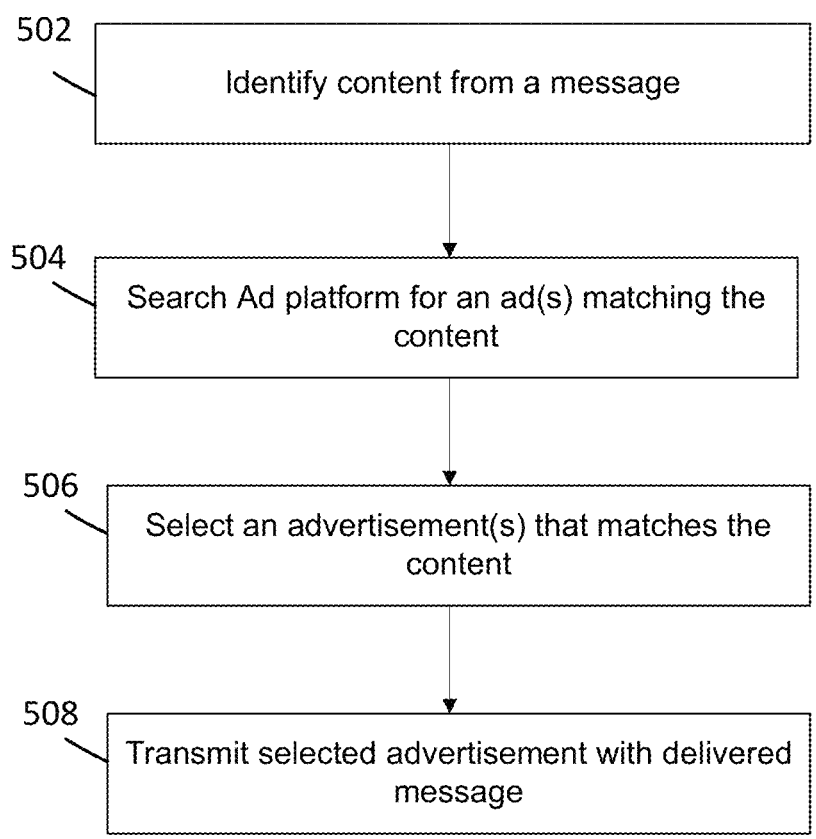

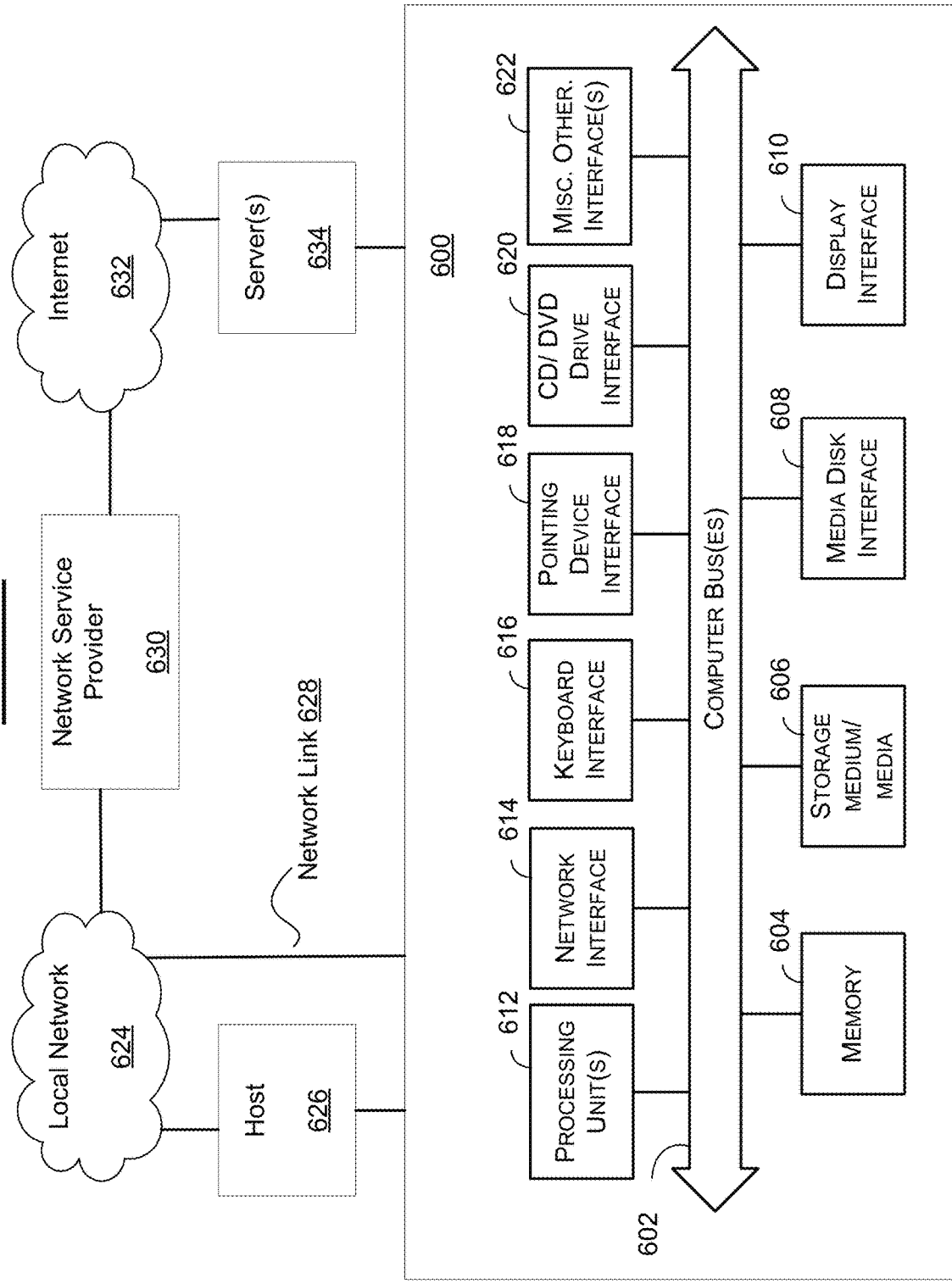

SYSTEM AND METHOD FOR SELF-DESTRUCTING MESSAGES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email management, and more specifically, towards systems and methods for automatic self-destruction of communicated messages.

RELATED ART

Electronic mail ("email") usage has become ubiquitous for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, co-workers, customers, and the like. Thus, electronic communications, such as electronic mail, provide a powerful means of communicating content to a targeted audience.

SUMMARY

The present disclosure describes systems and methods for automatically deleting messages from a recipient's inbox. According to some embodiments, the disclosed systems and methods provide the ability for automatic actions to be taken on delivered messages based on a passage of time. This enables a sender of messages, an email service provider and/or email platform to exert control over sent messages thereby limiting the number and type of operations that may be performed on such messages. For example, operations such as saving, forwarding, printing, copying, or otherwise duplicating the message and/or message data can be prohibited and all together rendered impossible. The disclosed systems and methods enables the purging of messages and associated message data from a recipient's inbox at a certain specified time, after the passage of a pre-determined amount of time, or upon the detection of a specified event.

According to some embodiments, the disclosed systems and methods can be implemented as an extension to existing messaging applications, programs and/or services. This ensures that messaging clients and servers that handle such messages, as discussed herein, conform to the protocol specific to each message. Such protocol, which can be applied to any known or to be known message platform does not require a user(s) (e.g., message sender and/or recipient) to sign-up to a new mail provider/service. The disclosed systems and methods provide additional control of delivered messages not previously present in existing message applications through a protocol-enhancement that enables message data to self-destruct from within a recipient's inbox after a message is delivered. According to embodiments of the present disclosure, the messaging protocol discussed herein provides functionality for messages to self-erase (from the client and server) after stipulated operational criteria, such as a date range, specified time or action taken or requested to be taken.

In accordance with one or more embodiments, a method is disclosed which includes receiving, at a computing device over a network from a first user, a message addressed to an inbox associated with a second user, the message comprising message content and a time-to-live (TTL) restriction embedded within metadata of the message, the TTL restriction comprising a TTL trigger indicating the message is being sent via short-lived (SL) protocol that enables the message to self-destruct in accordance with the TTL restriction; determining, via the computing device, that the second user's message account hosting the inbox of the second user supports SL protocol; delivering, over the network, the message to the inbox of the second user; parsing, via the computing device, the message to determine when the TTL restriction is satisfied, the parsing comprising parsing the metadata to identify the TTL trigger; monitoring, via the computing device, an environment to detect an event satisfying the trigger; and causing, in response to the trigger detection, the deletion, via the computing device, of the message from the second user inbox when the TTL restriction expires.

In accordance with one or more embodiments, a method is disclosed which includes determining, via the computing device, that the second user message account does not support SL protocol; storing, via the computing device, the message in data storage on the network; creating, via the computing device, a link message, the link message comprising a link to the stored message, the link message being compliant with the TTL restriction; and delivering, over the network, the link message to the second user inbox.

In some embodiments, the method further includes parsing, via the computing device, the link message to determine when the TTL restriction is satisfied, the parsing comprising parsing metadata of the link message to identify the trigger; monitoring, via the computing device, the environment to detect a second event satisfying the trigger; and causing, in response to the second trigger detection, deletion, via the computing device, of the stored message when the TTL restriction expires. In some embodiments, the method further includes causing, in response to the second trigger detection, deletion, via the computing device, of the link message from the inbox of the second user when the TTL restriction expires.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for automatic self-destruction of communicated messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIG. 5 is a flowchart illustrating steps performed in accordance with some embodiments of the present disclosure; and FIG. 6 is a block diagram illustrating architecture of a hardware device in accordance with one or more embodiments of the present disclosure.

DESCRIPTION OF EMBODIMENTS

Figure 1:
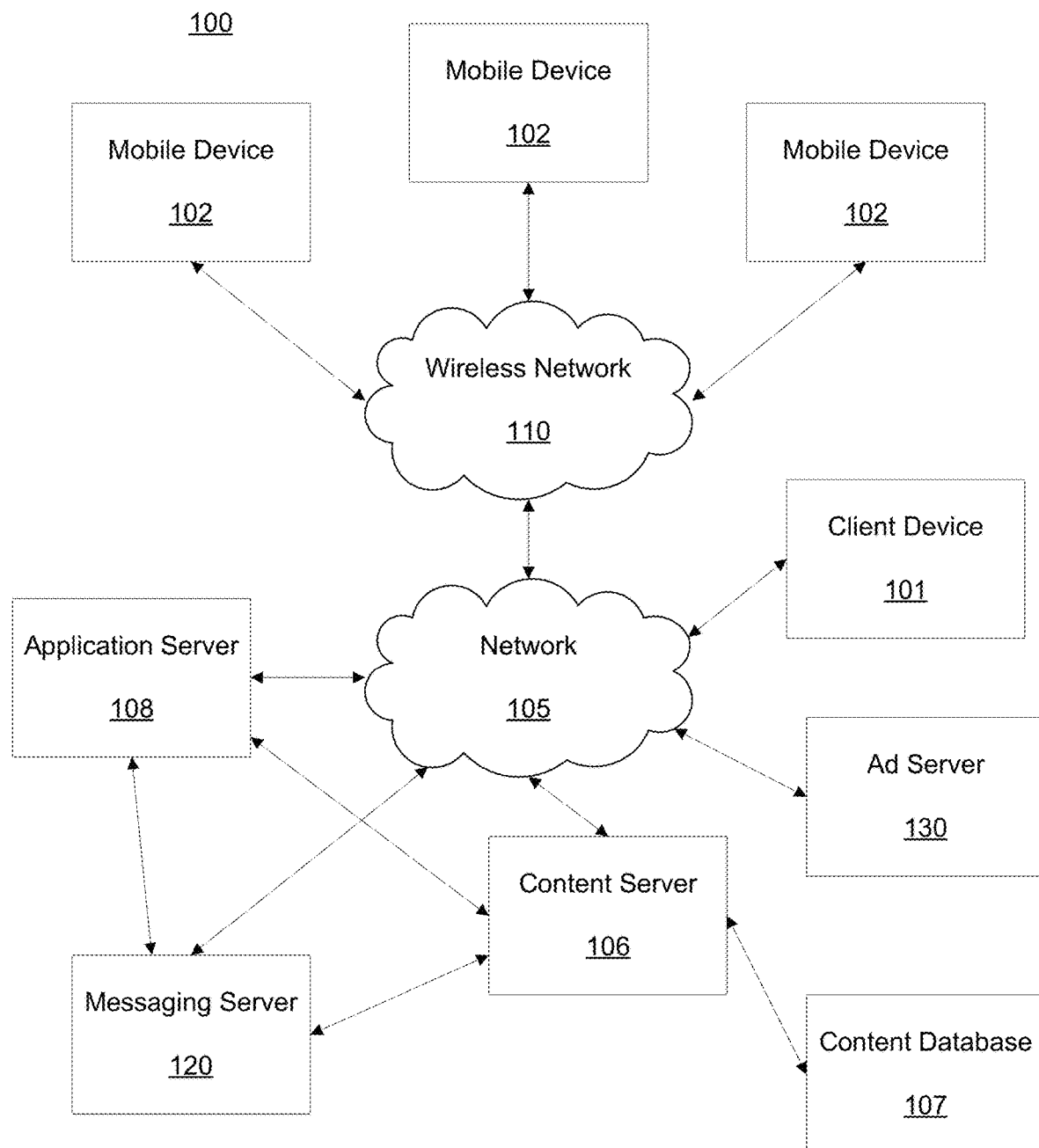
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Modern active email users receive a large number of email messages as usages for such messaging have become omnipresent. Indeed, electronic mail usages are on the rise as they provide a powerful means of communicating content to a targeted audience. However, the ease with which e-mail systems allow users to save, copy and forward messages has led to over-exposure of content and privacy concerns, whether personal, confidential, professional or commercial. That is, in the current landscape, once a message has been sent, the message may be subsequently forwarded to other e-mail users, printed, saved, copied, moved, and otherwise replicated. The inability to control the number and types of operations that may be subsequently performed on a sent or received message makes conventional messaging systems unsuitable for sending information for which absolute control of distribution is desired and/or is a necessity.

Traditional efforts to secure email communications have failed in restricting actions or operations allowed to be taken on specific messages or content. Some conventional systems attempt to remedy such concerns by simply turning message content into an image and rely on the image being served from the server-side; however, if the image message is downloaded and/or cached by the email provider or recipient device, then such approaches fail to work. Such systems, as well as other approaches, may be convenient for implementation, but they are not suitable for protecting all types of information, and are not reliable as they will not be effective across delivery scenarios, such as messages already being delivered or downloaded to a device, or with respect to messages being delivered across message platforms or across device platforms (e.g., to or between mobile devices), and the like. Indeed, conventional systems may also be inappropriate for sending confidential or propriety information because such systems do not allow the sender of a message to control the lifespan or time of destruction of such messages. These systems can not and do not enable a sender of a message to be certain that sent messages will ever be deleted.

The present disclosure provides systems and methods that remedy such shortcomings by providing functionality to messaging applications, programs and services that enables the messages to automatically self-destruct. According to embodiments, the disclosed systems and methods can be implemented through an installed extension associated with any known or to be known messaging application, program and/or service. In some embodiments, the extension can be associated with a server handling the communication of messages, and in some embodiments, the extension can be associated with an application program being utilized for viewing delivered messages. In some embodiments, for example, the disclosed systems and methods can be an extension to core Simple Mail Transfer Protocol (SMTP), which eliminates a dependency on external software or applications.

Thus, the disclosed systems and methods provide additional control of delivered messages not previously present in existing message applications through a protocol or application level enhancement that provides for self-destruction of message data from a recipient's inbox after a message is delivered. According to embodiments of the present disclosure, the messaging protocol discussed herein provides functionality for messages to self-erase (from the client and server) after stipulated operational criteria, such as a date range, specified time or action taken or requested to be taken, as discussed in more detail below.

The present disclosure provides systems and methods for self-destructing messages that allow a user (or email provider or administrator) to specify time criteria for the destruction of sent (and delivered) messages, whereby upon satisfaction of such time criteria, all instances of the delivered message will be destroyed. That is, in some embodiments, after a time criteria has been satisfied, all versions of a delivered message will be destroyed. Such versions can include copies of the message in a recipient's inbox, on a recipient's device and/or on a server hosting the messaging platform (and database associated with such platform). In some embodiments, the message copy in the sender's sent folder can also be deleted. According to some embodiments, the disclosed systems and methods can restrict the number and type of operations that may be subsequently performed on sent messages, thereby restricting the ability of a recipient to replicate the message.

By way of background, there are typically two types of message templates: global templates and site-specific templates. For example, an email template generally has the following properties:

| | |
|---|---|
| Display name | The name of the template displayed in the user interface. |
| Code name | The name of the template used in code. |
| E-mail type | Identifies the type of functionality to which the template is related. This can be used to categorize and filter e-mail templates. |
| From | E-mail address that will be used as the sender (From) address of the e-mail. |
| To | Email address that will be used as the recipient address of the email. |
| Cc | E-mail addresses of copy recipients. |
| Bcc | E-mail addresses of blind copy recipients. These will get a copy of the e-mail, but won't see the addresses of other recipients in the mail. |
| Subject | Subject of the e-mail. |
| HTML version | Defines the content that is used for the template when sending e-mails in HTML format. The preferred format can be selected by the user as part of system set-up or preference indication, for example, by using the Site Manager -> Settings -> System -> E-mails -> E-mail format setting. |
| Plain text version | Plain text version of the e-mail template. |

The presently disclosed systems and methods can utilize either type of message template, and or any other known or to be known message template, whether user or machine generated, and/or any other known or to be known messaging protocol to provide or embed a time-to-live (TTL) flag (or tag) within the message that controls the message's lifespan, availability and actions to be performed. In some embodiments, the TTL flag can be associated with a standard Multi-Purpose Internet Mail Extensions (MIME) message header. In some embodiments, the TTL flag can be set by adding values or variables to an Internet Engineering Task Force (IETF) header or using unused bits within the IETF header.

As discussed in more detail below, the TTL flag can be associated with the message upon generation of the message or upon transmittal of the message. That is, a user, messaging or content administrator, messaging service provider and the like, or some combination thereof, can embed the TTL flag in the message prior to delivery of a message which governs the message's time for destruction. Entry or association of the TTL flag to a drafted message can be resultant of a user prompt or entry of a command. For example, upon generating a message, a user may be prompted to provide a time for which the message should be deleted after delivery. In another example, a user may enter a command in the message, or in a dialog-box associated with the message, which effectuates the TTL flag being associated with the drafted message or included in the message's metadata. Thus, as discussed in more detail below, the TTL flag can relay or communicate its predefined behavior to the recipient either via a Message Transfer Agent (MTA) or via a server associated with the recipient.

As discussed in more detail below, the TTL flag can contain information for a timestamp representing an actual time at which the message will expire, or the TTL flag can contain a timer which indicates a time that should elapse before the message should self-destruct, or the TTL flag can contain an action identifier that identifies an action that triggers self-destruction. According to embodiments of the present disclosure, the time for destruction of a delivered message can be indicated through any standard unit of time, such as but not limited to, GMT time, elapsed seconds or milliseconds, date change-over, or the detection of a trigger, by ways of non-limiting example.

For example, a message may be directed to self-destruct after 5000 seconds after transmittal from the sender, after delivery to the recipient, or 5 minutes after the recipient has read the message. In another example, the message may indicate that after 10 days from transmission (or delivery), the message must self-destruct. In some embodiments, timing for self-destruction of the message can be based on when the message was sent from the sender to the recipient, when it was delivered to the recipient's inbox, or when it was actually reviewed by the recipient, such as when the recipient opens or views the message. In yet another example, a specified date, for example, Jan. 1, 2015 may be set as the timestamp in the TTL flag; therefore, on midnight on Jan. 1, 2015, the message will be automatically deleted.

According to some embodiments, the disclosed systems and methods may not be limited to a timing criteria, as discussed above. That is, in some embodiments self-destructing (or short-lived) messages may alternatively or also be limited to other factors or characteristics of communicated messages. For example, criteria for deleting a message may be based on, but not limited to, the size of the message, the number of times a message has been viewed, if the message has been replied to, if the message comprises an attachment, the identity of the recipient, identity of the sender, an attempt to forward, or other action enabled in the messaging platform, system or application. For example, as discussed in more detail below, if a message has an attachment, the attachment may not be eligible for download. That is, the attachment may only reside on the server and will only be eligible for viewing upon opening the message the attachment is associated with. As such, upon deleting the message from the recipient's inbox when the TTL flag expires, the attachment that resides on the server will also be deleted; this prevents unwanted replication of the attachment.

Thus, the expiration or passage of time or the reaching of a time or detection of an event (e.g. attempt to forward or print, for example) are treated as a trigger event that causes the destruction of a message. The message application, or a message server, or an intermediary application or device or combinations thereof can identify a TTL trigger in a message, in some embodiments by parsing the message metadata, monitor the messaging environment to detect the occurrence of the trigger (a time reached or elapsed, or a forward attempt being made, for example) and upon detection of the trigger, destroy the message.

According to some embodiments, the header or portion of the message containing the TTL flag may be encrypted to avoid the possibility of changing or corrupting the message's control. That is, for security of the information contained within sent messages, message may be secured by using a known or to be known negotiated encryption key or a pre-defined encryption key. Such encryption may occur at the sending device, receiving device and/or communicating server(s), or some combination thereof.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
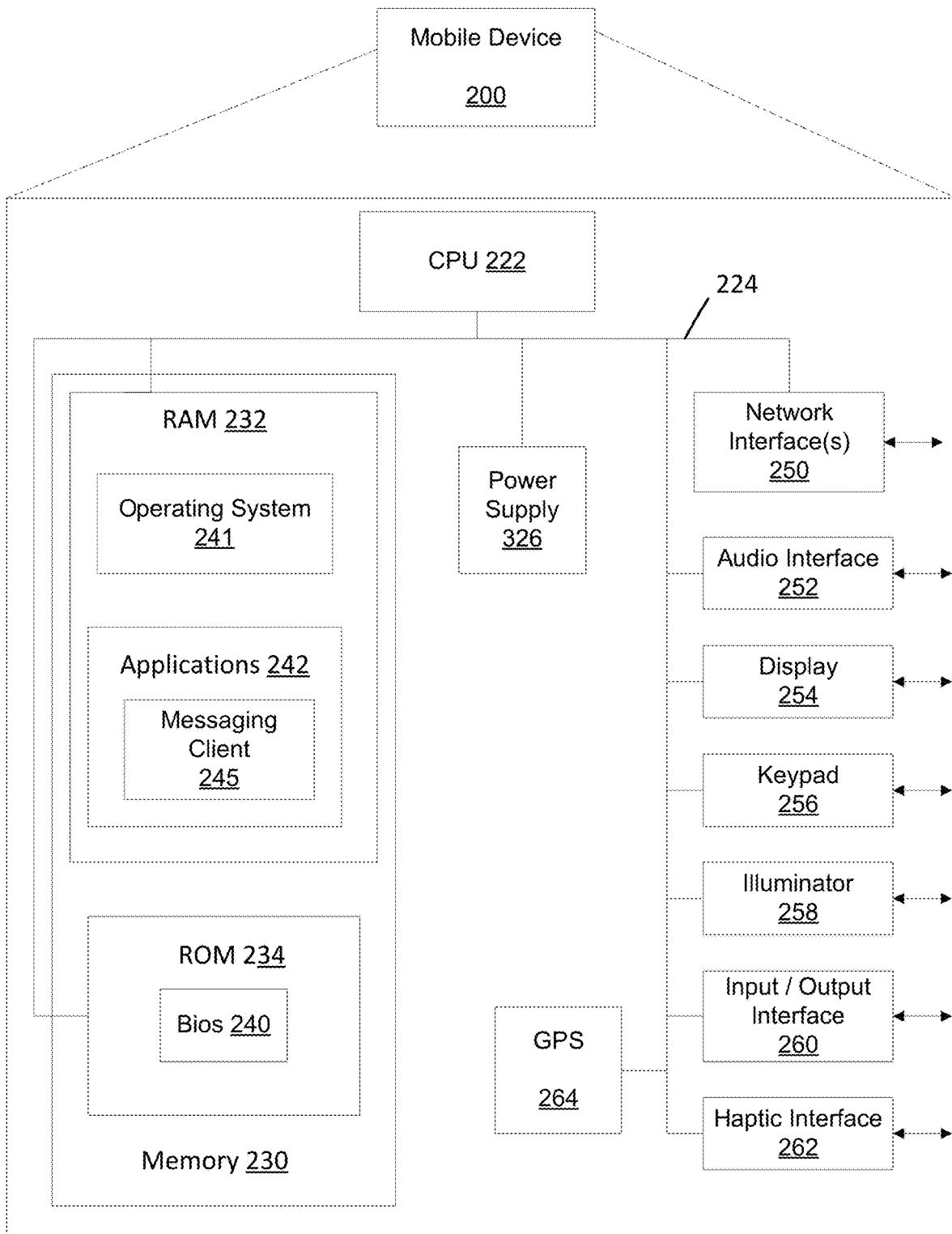
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
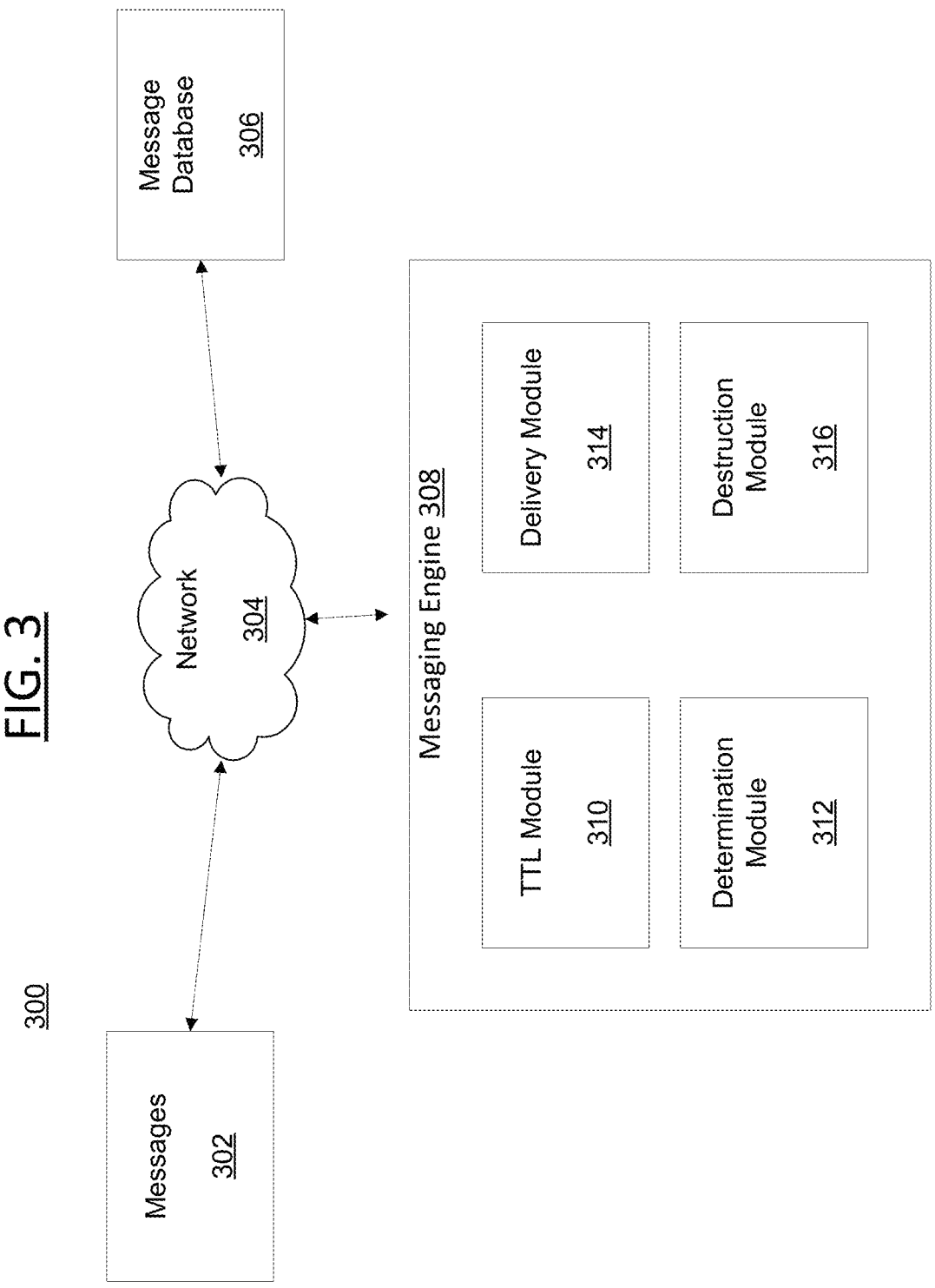
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include email messages, HTML forms SMS/MMS messages, Skype® messages, Twitter® messages and other social messages, comments to an article or website, online forum posts/entries, word processing documents, help desk messages, portable document format (PDF) documents and/ or other types of documents. The messages 302 can be provided to the message engine 308 or accessed by a computer program or device that can access the messages. In some embodiments, the messages 302 can be stored in a database of stored messages 306, which is associated with an email provider, such as Yahoo! Mail®. The database 306 can be any type of data storage, database, memory or file storage that can store the messages 302 and associated message template information, as discussed above.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be communicated and/or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The message engine 308 includes a time-to-live (TTL) module 310, a determination module 312, delivery module 314 and a destruction module 316. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4.

FIG. 4 is a process 400 diagram illustrating steps performed in accordance with embodiments of the present disclosure for delivering messages according to Short-Lived (SL) protocol. That is, the present disclosure involves automatically deleting a delivered message upon the occurrence or satisfaction of a trigger such as a predetermined passage of time or occurrence of an expiration date associated with the delivered message. As discussed herein, the automatic deletion of the delivered message not only occurs from within the recipient's inbox, but also from the recipient's device and from the server communicating the message, so as to effectuate a permanent deletion or deletion that is unrecoverable by a sender and/or a recipient.

By way of a non-limiting example, according to embodiments discussed herein, user Bob drafts a message to user Jane. In the message, Bob includes his social security number (SS #) because Jane has requested it. Since this is important information to Bob and protecting his SS # is vital to protecting his identity, Bob would like to have this message expire immediately after Jane needs this information. For example, prior to sending the message, Bob sets an expiration date on the email for 24 hours. Therefore, the message will expire after 24 hours from Bob actually sending the message.

As with the above to example, as discussed herein, the message will be deleted regardless of whether Jane actually opens the message. As discussed above, embodiments exist where the delivery time criteria can be preset in accordance with Jane actually opening the message, as opposed to the transmittal of the message (from Bob). For example, Bob can set the message to be deleted 5 days after Jane actually opens the message. Therefore, if Jane opens the message 2 days after receiving the message in her inbox, the message will self-destruct 5 days after she opens it (7 days after being sent).

In another example between Bob and Jane, Bob is drafting a message on Jan. 1, 2015 relating to an event on the morning of January $3^{rd}$ and thus would like his message to self-destruct on Jan. 3, 2015 at 10:00 AM, since after that the email would be irrelevant. Bob can set this time criteria or trigger prior to sending the message; therefore, at 10:00 AM on Jan. 3, 2015, the message will automatically self-destruct and be deleted from Jane's inbox.

In another non-limiting example, company X sends user Jim a message containing a coupon for Black Friday sales at their store. This is a time sensitive promotion and company X also would like to ensure that the number of coupons being used does not exceed a certain amount. Therefore, company X sets the expiration date on the message to 9:00 am on Friday, Nov. 28, 2014, whereby the message will self-destruct at that time. Additionally, company X benefits from sending this type of message, because, as discussed herein, time-restricted messages can not be forwarded or duplicated in any manner. Therefore, even prior to the messages expiration, Jim can not forward the received coupon to his friends for use, which enables company X to control which people receive their promotions.

Thus, as discussed in more detail below, the disclosed systems and methods provides functionality for messages to be removed or become unrecoverable, which to a user is perceived as self-erasure after a stipulated amount of time. The content of the messages being delivered according to the disclosed protocol will be permanently discarded when the message self-destructs as denoted by TTL restrictions within the TTL flag embedded in the messages, and such messages can thus be prohibited from being forwarded or copied in any way. This allows sharing of sensitive or temporarily relevant information without the fear of such information being forwarded, saved or downloaded. In embodiments the sender can also have the message deleted from their sent mailbox, such that sensitive emails are destroyed at both the sending and receiving location(s).

In some embodiments, the recipient is able to respond to the message (i.e., reply), but only prior to the message self-destructing. However, if the recipient does reply, a copy of the sent message is not saved in the recipient's sent folder, nor is the original content from the original message sent in the reply. The reply message will follow the TTL restrictions associated with the original message from which the reply was based. In some embodiments, the reply message may be subject to additional or alternative TTL restrictions, in a similar manner discussed herein.

Once the TTL expires, the message, message data and all associated content is hard deleted, which renders them unrecoverable. Indeed, the details of the sender, such as the sender's messaging address and identity, are also discarded when the sender's message self-destructs. That is, the SL protocol discussed herein can be set to not allow the option of saving the sender's email address in the receiver's address book nor does it support a feature of auto-saving unknown email addresses that are provided by some messaging providers.

Turning back to FIG. 4, process 400 begins at Step 402 with a user drafting a message. According to embodiments of the present disclosure, the drafted message can be a new message, a forwarded message or a reply message; however, it should be understood that any newly drafted forward message may not be based off of an original message subject to the TTL restrictions, as such forwarded drafts would be subject to those TTL restrictions and are prohibited from being sent, as discussed above.

In Step 404 the TTL restrictions are set or applied to the newly drafted message, and as a result the message is treated as a SL message. The TTL restrictions are set as a TTL flag associated with the drafted message, as discussed above. Setting and associating the TTL restrictions is performed by the TTL module 310. As discussed above, the TTL restrictions enable a sender of the message to exert control the drafted message upon transmittal in order to limit the number and type of operations that may be performed on such messages. The TTL restrictions comprise information dictating the lifespan of the message. That is, the TTL restrictions govern the message's time for destruction.

In some embodiments, entry or association of the TTL restrictions to the drafted message can be resultant of a user prompt. That is, during drafting of the message, completion of the message or upon receiving a send command from the sending user, the sending user may be provided with a prompt requesting whether the message is to be subject to TTL restrictions. This prompt can enable the user to enter the TTL restrictions associated with the message, as discussed herein.

In some embodiments, the TTL restrictions can be applied to the message by way of a command entry typed directly in the message. For example, a TTL command can be based on a user's text or character entry in connection an identified syntax or operator that signifies a TTL restriction is being entered. A TTL command can take the form of any known or to be known syntax or operators. For example, a TTL command can be detected by text or characters being entered within a set of brackets—for example: [Jan. 1, 2015], which signifies that the message is to expire on Jan. 1, 2015. In another non-limiting example, a TTL command can also be denoted by the use of a colon operator or hashtag. For example, if user desires for the message to expire in 24 hours, the user can enter "#24 hours." The type of operator should not be construed as limiting to the current disclosure, as any type of known or to be known operator triggering a TTL restriction is applicable to Process 400.

According to some embodiments, the TTL restrictions may be set not only by the drafting user, as discussed above, but also by a messaging administrator, an email service provider and/or email platform, or some combination thereof.

According to embodiments of the present disclosure, presetting of the TTL restrictions provides an indication to the communicating server, receiving recipient and/or email platform, or some combination therefore, that certain operations associated with the message after delivery to the recipient are disabled. For example, as discussed above, operations such as saving, forwarding, printing, copying, or otherwise duplicating the message and/or message data may be rendered inoperable for the recipient.

It should be understood that Step 404 can be associated with an ongoing composition of a message or a composed message, as Step 404 is applicable to a message "draft" and a completed message prior to transmittal to the recipient. That is, as evident from the below discussion, the TTL restrictions can be embedded in a message during composition of a message or after completion of drafting the message, but prior to sending the message.

In Step 406, the SL message is sent from the sender to the recipient. Specifically, the SL message (message with embedded TTL restrictions) is communicated from the sending user to a server, which then determines the manner of communication of the message to the recipient. This determination occurring in Step 408 is performed by the determination module 312.

Step 408 involves the server determining if the messaging account of the intended recipient supports the disclosed SL protocol. According to some embodiments, the determination can be solely server based, in that the server is able to determine whether the recipient's message account has the SL extension installed, as the server is the responsible messaging server for the recipient's (and sender's) messaging account. In some embodiments, as discussed above, the server can make the determination of Step 408 by determining whether the SMTP associated with the recipient's messaging account has the SL extension installed. In some embodiments, the server can ping the recipient's device in order to determine whether the recipient's device has the SL extension installed. As discussed above, the determination occurring in Step 408 can be performed via a Message Transfer Agent (MTA).

According to some embodiments of the present disclosure, the determination occurring in Step 408 can involve a handshake between the communicating server of the sender and the messaging server or recipient's device, or some combination thereof, associated with the recipient's messaging account. The handshake requires the server attempting to send the SL message to the recipient to determine whether the recipient supports SL protocol. As understood by those of skill in the art, such handshaking can involve an automated process of the communicating server and device/server associated with the recipient's messaging account negotiating dynamic SL parameters to determine if the recipient's messaging account is associated with the SL extension.

As discussed above, SL protocol involves the ability for a message to self-destruct (or automatically delete) upon the TTL restriction being satisfied. In some embodiments, the determination in Step 408 may be based on the recipient's messaging program or provider and/or device being used for messaging supporting a certain version of the SL protocol. In some embodiments, such determination may involve the server sending a request to the recipient requesting a response indicating whether the recipient is SL complaint. If the response indicates that the recipient is SL complaint then the determination identifies that the recipient is SL compliant. If the response indicates otherwise, or no response is received, then the recipient is determined to not be SL compliant.

In some embodiments, the determination in Step 408 can occur from (or within) a single message platform, e.g., Yahoo! Mail®; and in some embodiments, the across multiple platforms, such as Yahoo! Mail®, Google Mail®, Hotmail®, and other personal and business email platforms, such as Microsoft Outlook®, and the like. Such determinations can occur offline and/or online.

The determination of Step 408 forms the basis for which type or form of SL message is to be sent to the recipient. If the determination identifies that the recipient is SL complaint, then the message is transmitted to the recipient. Step 410. However, if the recipient is determined to not be SL compliant (i.e., does not support the disclosed messaging self-destruct protocol), Process 400 proceeds to Step 418.

In Step 418, the SL message is saved on the server. The saving of the message can involve saving the message in an associated database associated with the sender, recipient, or in a dedicated SL portion of the database solely dedicated to handling SL messaging. In Step 420, a link message is created and sent to the recipient (instead of the SL message). The link message comprises a link (e.g., URL) pointing to the server-side copy of the SL message and includes the TTL restrictions set in Step 404. The link message enables the recipient to view the SL message by opening the link message and selecting (e.g., clicking on) the link which forms the body of the message; however, the link message restricts the recipient from downloading or otherwise viewing more than a preview of the message. Steps 410, 418 and 420 are performed by the delivery module 314. The stored SL message on the server and the link message remain controlled by the TTL restrictions set in Step 404. That is, as discussed below, when the TTL restrictions expire, not only is the stored SL message on the server deleted, the link message sent to the recipient is also deleted. Indeed, the link message behaves in a manner identical to the standard SL message ensuring that messaging users of non-complaint providers are capable of receiving self-destructing messages.

In either path, where the SL message is sent to the recipient (Step 410) or where a created link message is sent to the recipient (Step 420), Process 400 then proceeds to Step 412 where the environment of the delivered message (via system clock, application timer, command detection or other monitoring) is monitored to determine if the TTL restrictions are satisfied. Step 412 is performed by the destruction module 316. Such monitoring involves determining whether the TTL restrictions have expired by parsing the message (either the SL message or link message) to identify the embedded TTL restrictions.

When the TTL restrictions are determined to have expired, the message is hard deleted (or securely deleted). Step 414. That is, for the SL message delivered in Step 410, once the TTL expires, the message, message data and all associated content is hard deleted from the recipient's inbox, which renders them unrecoverable. From Steps 418 and 420, the stored SL message is hard deleted from the server and the link message residing in the recipient's inbox is also hard deleted. During the time the TTL restrictions are not satisfied, or in other words, when the timer is still running until the TTL expiration date/time, the monitoring that occurs in Step 412 is continued. Step 416.

According to some alternative embodiments, when the determination of Step 408 results in the recipient being identified as not being SL compliant, instead of Steps 418-420 occurring, embodiments may exist where the SL message may be rejected and denied from being sent. In such embodiments, this ensures that SL messages are sent only when there is a guarantee of their destruction on the client side.

By way of another non-limiting example, illustrating the steps performed in Process 400, solely for illustration purposes and not to be construed as limiting, user Bob drafts an email to user Jane (Step 402). Bob sets the TTL restrictions so that the message self-destructs in 48 hours (Step 404), and then sends the message (Step 406). A server receives the message from Bob and determines whether Jane's mail program is SL compliant (Step 408).

For example, if Jane is using a SL compliant mail program, the message is sent to Jane's inbox (Step 410). The message will remain present in Jane's inbox until the TTL restrictions set by Bob expire. After 48 hours the message will self-destruct which will result in the message not only ceasing to appear in Jane's inbox, but also all of the message data associated with the message will be purged from Jane's inbox and devices (Step 414).

Should Jane be determined to be using a non-complaint SL program, the message will be saved on the server (Step 418). A link message will be created and sent to Jane (Step 420). The link message remains subject to the TTL restrictions set by Bob. The link message comprises a link pointing to the server-side copy of the message. The link message will remain present in Jane's inbox until the TTL restrictions set by Bob expire. After 48 hours the server-side message and link message will self-destruct which results in the server-side copy being hard deleted as well as the link message being hard deleted (Step 414).

By way of further example, using the instance where Jane receives the SL message (Step 410), prior to the TTL restrictions expiring, Jane desires to send a reply message to Bob. Jane is only able to reply to the message prior to 48 hours expiring. Also, as a result of the TTL restrictions being set on the message, Jane is unable to forward, copy, download, save or otherwise replicate the received SL message.

Prior to the TTL restrictions expiring, Jane can reply to the message, and according to some embodiments, the reply message carries the same TTL restrictions set by Bob. That is, in some embodiments, if Jane replies to Bob's message after 24 hours, Jane's message may only have a 24 hour lifespan before her message self-destructs from Bob's inbox. Thus, in such embodiments, the original TTL restrictions set by Bob govern any message related to his original message.

In some embodiments, Jane can set additional TTL restrictions to her message, whereby her message will have a lifespan only in accordance with the stipulated timing she sets. For example, after 24 hours Jane replies to Bob's message. Jane sets a TTL restriction on her reply for her message to expire only after Bob views the message. (As discussed above, TTL restrictions may not only be time based, they can be based on specified events). Therefore, as long as Bob has not viewed Jane's reply message in his inbox, the reply message will not expire; however, as soon as he views the message then closes it, Jane's message would then self-destruct.

FIG. 5 is a work flow 500 of serving relevant advertisements based on the content of delivered messages. Specifically, FIG. 5 illustrates how advertisements are served to a recipients of messages based on the specific content from the messages directed to a recipient. It should be understood that such content is not limited to the content of the email's body—such content can include, but is not limited to, the subject of the message, the sender's identity, the recipient's identity, the TTL restrictions, and the like.

In Step 502, content from a communicated message, as discussed above, is identified (or extracted). That is, content in a message, or a type of content associated with a message that is sent from a sender for receipt by a recipient forms a basis for a context for serving advertisements having a similar context. In some embodiments, the identification of the context from Step 502 may occur during drafting the message, prior to delivery of the message, upon delivery of the message, and/or after delivery of the message, or some combination thereof. In Step 504, the content (or content data) is communicated (or shared) from the email platform to an advertisement platform comprising an advertisement server 130 and ad database. Upon receipt of the content data, the advertisement server 130 performs a search for a relevant advertisement within the associated ad database. The search for an advertisement is based at least on the identified content.

In Step 504, the advertisement server 130 searches the ad database for advertisements that match the identified (and extracted) content. In Step 506, an advertisement is selected (or retrieved) based on the results of Step 504. In some embodiments, the advertisement can be selected based upon the result of Step 504, and modified to conform to attributes of the page or inbox upon which the advertisement will be displayed, and/or to the device for which it will be displayed. In some embodiments, as in Step 508, the selected advertisement is shared or communicated via the email platform. In some alternative embodiments, the selected advertisement is sent directly to each user's computing device. The advertisement is displayed in conjunction with the message appearing in the recipient's inbox. According to some embodiments in conjunction with the above discussion, the selected advertisement can be shared/communicated upon the message being visibly displayed in the recipient's inbox and removed from display (or deleted or updated with other content) upon the associated message being deleted.

By way of a non-limiting example, user Bob sends user Jim a message containing content associated with a concert at Madison Square Garden (MSG) that is occurring in 5 days. Bob sets the TTL restrictions so that the message will self-destruct in 5 days. In some embodiments, an advertisement can be selected and provided to Jim, where the ad may be based on coupons for restaurants at MSG. In some embodiments, since the TTL restrictions coincide with the concert date, selected ads may focus on coupons for the concert and/or restaurants in or around MSG; however, these ads may cease to be displayed after the TTL restrictions expires.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device over a network from a first user, a message addressed to an inbox associated with a second user, said message comprising message content and a time-to-live (TTL) restriction embedded within metadata of the message, said TTL restriction comprising a TTL flag indicating the message is being sent via short-lived (SL) protocol that enables said message to self-destruct in accordance with the TTL restriction, said TTL flag comprising first information restricting types of actions that can be performed on the message, the TTL flag further comprising second information indicating a number of times each action can be performed on the message before self-destruction;

determining, via the computing device, that the second user's message account hosting the inbox of said second user supports SL protocol;

delivering, over the network, the message to the inbox of said second user;

parsing, via the computing device, said message to determine when said TTL restriction is satisfied, said parsing comprising parsing said metadata to identify the TTL flag;

monitoring, via the computing device, an environment to detect an event satisfying the first information or second information of said TTL flag; and causing, in response to said flag detection, deletion, via the computing device, of said message from said second user inbox, said deletion causing data associated with the message to be deleted from said second user inbox as well as from a data location other than said second user inbox, when said TTL restriction expires.

2. The method of claim 1, further comprising:

determining, via the computing device, that said second user message account does not support SL protocol;

storing, via the computing device, the message in data storage on the network;

creating, via the computing device, a link message, said link message comprising a link to the stored message, said link message being compliant with the TTL restriction; and delivering, over the network, said link message to said second user inbox.

3. The method of claim 2, further comprising:

parsing, via the computing device, the link message to determine when the TTL restriction is satisfied, said parsing comprising parsing metadata of the link message to identify said flag;

monitoring, via the computing device, said environment to detect a second event satisfying said flag; and causing, in response to said second flag detection, deletion, via the computing device, of the stored message when the TTL restriction expires.

4. The method of claim 3, further comprising:

causing, in response to said second flag detection, deletion, via the computing device, of said link message from said inbox of the second user when said TTL restriction expires.

5. The method of claim 1, wherein said TTL restriction is set by said first user prior to said first user sending the message.

6. The method of claim 1, wherein said flag comprises a specific timing for when said deletion is to occur.

7. The method of claim 1, wherein said TTL restriction comprises a restriction disabling the second user's ability to duplicate and store said message.

8. The method of claim 1, wherein said second user is able to reply to said message only prior to expiration of the TTL restriction.

9. The method of claim 1, further comprising:
communicating, over the network, said message content to an advertisement platform for identification of an advertisement associated with said message content; and
communicating, over the network, said identified advertisement to said second user for display in association with the display of the message.

10. The method of claim 1, wherein the data associated with the messages includes a reply to the message, and wherein the data location other than the inbox of said second users includes a sent folder of said second user.

11. A non-transitory computer-readable storage medium tangibly encoded with computer-executable instructions, that when executed by a processor associated with a computing device, performs a method comprising:
receiving, over a network from a first user, a message addressed to an inbox associated with a second user, said message comprising message content and a time-to-live (TTL) restriction embedded within metadata of the message, said TTL restriction comprising a TTL flag indicating the message is being sent via short-lived (SL) protocol that enables said message to self-destruct in accordance with the TTL restriction, said TTL flag comprising first information restricting types of actions that can be performed on the message, the TTL flag further comprising second information indicating a number of times each action can be performed on the message before self-destruction;
determining that the second user's message account hosting the inbox of said second user supports SL protocol;
delivering, over the network, the message to the inbox of said second user;
parsing said message to determine when said TTL restriction is satisfied, said parsing comprising parsing said metadata to identify the TTL flag;
monitoring an environment to detect an event satisfying the first information or second information of said TTL flag; and
causing, in response to said flag detection, deletion of said message from said second user inbox, said deletion causing data associated with the message to be deleted from said second user inbox as well as from a data location other than said second user inbox, when said TTL restriction expires.

12. The non-transitory computer-readable storage medium of claim 11, further comprising:
determining that said second user message account does not support SL protocol;
storing the message in data storage on the network;
creating a link message, said link message comprising a link to the stored message, said link message being compliant with the TTL restriction;
delivering, over the network, said link message to said second user inbox;
parsing the link message to determine when the TTL restriction is satisfied, said parsing comprising parsing metadata of the link message to identify said flag;
monitoring said environment to detect a second event satisfying said flag; and
causing, in response to said second flag detection, deletion of the stored message when the TTL restriction expires.

13. The non-transitory computer-readable storage medium of claim 12, further comprising: causing, in response to said second flag detection, deletion of said link message from said inbox of the second user when said TTL restriction expires.

14. The non-transitory computer-readable storage medium of claim 11, wherein said TTL restriction is set by said first user prior to said first user sending the message.

15. The non-transitory computer-readable storage medium of claim 11, wherein said flag comprises a specific timing for when said deletion is to occur.

16. The non-transitory computer-readable storage medium of claim 11, wherein said TTL restriction comprises a restriction disabling the second user's ability to duplicate and store said message.

17. The non-transitory computer-readable storage medium of claim 11, wherein said second user is able to reply to said message only prior to expiration of the TTL restriction.

18. A system comprising:
a processor; and
a non-transitory computer-readable storage medium for tangibly storing thereon program logic for execution by the processor, the program logic comprising:
receiving logic executed by the processor for receiving, over a network from a first user, a message addressed to an inbox associated with a second user, said message comprising message content and a time-to-live (TTL) restriction embedded within metadata of the message, said TTL restriction comprising a TTL flag indicating the message is being sent via short-lived (SL) protocol that enables said message to self-destruct in accordance with the TTL restriction, said TTL flag comprising first information restricting types of actions that can be performed on the message, the TTL flag further comprising second information indicating a number of times each actions can be performed on the message before self-destruction;
determination logic executed by the processor for determining that the second user's message account hosting the inbox of said second user supports SL protocol;
communication logic executed by the processor for delivering, over the network, the message to the inbox of said second user;
parsing logic executed by the processor for parsing said message to determine when said TTL restriction is satisfied, said parsing comprising parsing said metadata to identify the TTL flag;
monitoring logic executed by the processor for monitoring an environment to detect an event satisfying the first information or second information of said TTL flag; and
deletion logic executed by the processor for causing, in response to said flag detection, deletion of said message from said second user inbox, said deletion causing data associated with the message to be deleted from said second user inbox as well as from a data location other than said second user inbox, when said TTL restriction expires.

19. The system of claim 18, further comprising:
determination logic executed by the processor for determining that said second user message account does not support SL protocol;

storage logic executed by the processor for storing the message in data storage on the network;

creation logic executed by the processor for creating a link message, said link message comprising a link to the stored message, said link message being compliant with the TTL restriction;

communication logic executed by the processor for delivering, over the network, said link message to said second user inbox;

parsing logic executed by the processor for parsing the link message to determine when the TTL restriction is satisfied, said parsing comprising parsing metadata of the link message to identify said flag;

monitoring logic executed by the processor for monitoring said environment to detect a second event satisfying said flag; and deletion logic executed by the processor for causing, in response to said second flag detection, deletion of the stored message when said TTL restriction expires.

20. The system of claim 19, further comprising:

deletion logic executed by the processor for causing, in response to said second flag detection, deletion of said link message from said inbox of the second user when said TTL restriction expires.

* * * * *